Patented Feb. 11, 1941

2,231,027

UNITED STATES PATENT OFFICE 2,231,027

METHOD OF PRODUCING WELDED JOINTS

Oskar Renner, Jr., Budapest, Hungary

No Drawing. Application September 15, 1937, Serial No. 163,961. In Hungary October 12, 1936

21 Claims. (Cl. 78—92)

This invention relates to the art of welding; and more specifically to welded joints between articles and to a method of producing such joints. One of the more valuable embodiments of the invention is the joining of railway steel rails, and for the sake of clarity of description the following specification is directed chiefly to this embodiment; but it will be understood that other embodiments are clearly within the scope of the invention.

The joining of railway rails by welding methods, instead of by the use of fish plates, is desirable and has been practiced with some success. Various welding processes have been proposed and used, including the Thermit process; electrical resistance welding; metal electrode electric arc welding; oxy-gas welding; forge welding; and the application of welded splice bars. Each of these processes and expedients, while suitable to a degree, possesses disadvantages.

The Thermit process, which has found extensive use, often does not produce weld metal having a controllably good quality, the welded rail joints are frequently undesirably brittle, and the process employs relatively expensive materials. Electric resistance welding requires heavy and expensive equipment for generating power and, because the process involves the actual melting of rail metal at and adjacent to the abutting ends, undesirably affects the strength of the joining rails. Arc welding and ordinary autogenous gas welding processes are relatively expensive and involve a long continued treatment of the rails at a high temperature, which detracts from the strength and ductility of the welds. The use of splice bars introduces abrupt changes in the cross section of the rails at the joints, and the attachment of the bars to the rails by welding methods involves the disadvantages mentioned above. Forge welding involves the fluxing of oxides between the abutting ends of the rails and the resulting slag cannot usually be entirely eliminated from the joint.

There is, therefore, a demand for a relatively inexpensive and reliable process for producing in railway rails joints having sufficient strength and ductility to withstand the demands of heavy railway service. One of the primary objects of the present invention is to provide a welding process particularly suitable for use in welding rails, in which the disadvantages discussed above are avoided or substantially eliminated. Another object is to provide an improved welded joint between metal members such as railway rails. Other objects are to provide a welding process requiring neither expensive materials nor cumbersome special equipment, in which no reinforcing members are used, and in which the heat treatment of the members being welded produces relatively little change in the metallographic structure of the members, because of the short time and relatively low temperatures involved in the welding operation. Other objects and advantages will become apparent as the following description proceeds.

According to the present invention, welding is effected by placing clean metallic surfaces in substantially perfect contact at an elevated temperature. In practice, the rail ends to be welded are prepared in a manner to obtain relatively plane smooth and clean adjacent surfaces which may be placed in substantially perfect surface-to-surface contact. The abutting surfaces are then held together in any suitable manner so that the said surfaces make as perfect contact as possible and thereby exclude air from the interface. High temperature heat is applied to the metal on both sides of the interface so produced, whereby the entire cross sectional surface to be welded is heated to a suitable welding temperature. The cross sectional surface or interface does not attain a temperature higher than that of the adjacent portions of rail metal. Preferably, the heat is applied over a portion or zone of the rail extending up to a distance of about 2.5 to 5 inches from the contacting surfaces. While such heat is being applied, the rail ends are held rigidly and preferably pressed together, suitably at a pressure initially at 300 to 2000 pounds per square inch, to exclude air from the joint. The expansion of the metal during heating may increase the pressure to some extent, and neither gas nor other undesired material can enter between the surfaces to be welded. Clean metallic contact is maintained and no deleterious chemical change, such as oxidation, can take place.

The indirect heating of the abutting surfaces of the rail by conduction of heat through the body metal of the rail is continued until a welding temperature is reached, whereupon the welding is effected. A suitable welding temperature will depend upon the composition of the rail but will be no higher than the solidus temperature of the metal, and will ordinarily be between about 1000° C. and about 1300° C. A temperature of about 1230° C. has been found to be quite suitable in most cases. These temperatures are those indicated by calibrated thermal couples inserted in the rails adjacent to the interface to be welded.

It may be desirable to use additional or renewed compression during or subsequent to the heating in order that the material when initially softened may close and fill any still existing spaces and cracks. Although pressure will ordinarily suffice to exclude air from the joint, it may in some instances be advantageous to seal the outer edges of the interface with an air-impervious material.

A preferred source of high temperature heat is the oxyacetylene flame, and the heating source is preferably so applied that the welding temperature is obtained uniformly over the entire interface to be welded by conduction through the rail metal of heat from one or more oxy-fuel gas flames. Other sources of heat may be used, of course, such as electric currents induced in the rail metal itself from a suitable source of high frequency electric current.

Strength tests made on numerous joints welded in accordance with this invention demonstrate the effectiveness of the process. The welds are substantially as strong and tough as any part of the original rail metal. The hardness of portions within, adjacent to, and remote from the weld is approximately the same. These results are due to the extremely low temperature (below the solidus of the metal) and the short time of heating which ordinarily need be only about 2 to 6 minutes, according to the size of the rail. In such a short time at such a low temperature the structure of the metal of the rails does not change very greatly. No non-metallic impurities or other foreign matter of any kind are found within the welds.

Although it is preferred that the surfaces to be welded be given a relatively high polish, satisfactory results may be attained with somewhat less perfectly fitted surfaces. Grinding, sawing, and lathe turning, for instance, produce surfaces which are quite satisfactory for the purpose. In the following table are shown the yield point (Y. P.) and ultimate strength (U. S.) in thousands of pounds per square inch, obtained in tensile tests made upon (A) unwelded rail steel, (B) a weld made in the same steel by heating for 3 minutes at 1230° C., the abutting surfaces having been prepared by grinding and being held together at an initial pressure of about 300 pounds per square inch, and (C) a weld made exactly as in "B," but with the surfaces prepared by lathe turning.

| Sample | Y. P. | U. S. |
| --- | --- | --- |
| A | 97 | 127 |
| B | 88 | 142 |
| C | 93 | 154 |

In other tests, rails weighing about 18.8 pounds per foot were welded at a temperature of about 1280° C. which was measured at the rail surface with an optical pyrometer. These rails were subjected to a hydraulic bending tent in which the rail was supported at points 3.94 feet apart, the weld being centrally located, and pressure applied at the weld through a tup having a radius of 0.98 inch. The yield point of the welded joint was reached at 20 to 24 thousand pounds pressure, as compared with 22 to 26 thousand pounds for the unwelded portions of the rail; and the ultimate strength for the welded rails was between 28 and 32 thousand pounds. The deflection during this bend test was about 1.2 inches.

Microscopic examinations of the welds made in accordance with this invention show that perfect union is effected and it is practically impossible to detect the exact line of union because there is no abrupt change in metallographic structure (size, shape, and distribution of grains) such as occurs in fusion welding operations. The only marked effect is a moderate coarsening of the grain in the neighborhood of the weld.

It is possible to make two welds close together at one heating. Such cases occur, for example, when rails are to be welded together in place on the track by using inserts between the opening joints in order to avoid the necessity of having to realign the rails or ties. In such cases the rails at a joint may be cleaned, shaped and forced apart so that the insert may be placed between them under compression and in substantially perfect surface contact with both of the rail end surfaces. Subsequent heating to a suitable temperature then completes the weld.

The heating may be effected by any source of high temperature heat, but the use of oxyacetylene flames offers many advantages, including convenience, portability, and availability. If desired, the welded joint may be given a subsequent heat treatment, either with the same source of high temperature heat as is used for the weld or with auxiliary heating means, for instance, flames of relatively inexpensive fuel.

It will be understood that the process of this invention may be used for welding objects other than rails, for example, beams, pipes and the like, either of steel or other weldable materials. Various other modifications may be made in the process described, and certain steps and features may be employed without others, without departing from the present invention or sacrificing any of its advantages.

I claim:

1. A method of welding metal members, which comprises providing clean, smooth surfaces to be welded; placing the members in abutting relation under pressure with the clean, smooth surfaces in surface-to-surface contact to substantially exclude air from the interface formed by such contacting surfaces; and, while said members are so pressed together in abutting relation, heating said contacting surfaces to an elevated welding temperature no higher than the solidus temperature of the metal to complete the weld substantially solely by heat conducted to said contacting surfaces through the metal members.

2. A method of welding metal members as claimed in claim 1, in which the heating is effected by applying high temperature flames to the exposed portions of said metal members adjacent said interface.

3. A method of welding together weldable metal members such as steel rails, beams, pipes, and the like, which method comprises providing plane clean surfaces at the ends of said members; abutting and pressing together the metal members with said clean surfaces in surface-to-surface contact, thereby excluding air from the interface; and, while continuing to press said members together, heating the entire periphery of said abutting members adjacent and at each side of said interface by welding heat applied to the exposed outer surfaces of said members, whereby the abutting surfaces at the interface are brought uniformly to a welding temperature not higher than the solidus temperature of the metal and are welded under pressure substantially solely by heat conducted to said surfaces through said metal members.

4. A method of welding together weldable metal members such as steel rails, beams, pipes, and the like, such method comprising providing substantially clean and smooth surfaces on portions of the members to be welded; placing such members in abutting relation with such surfaces in surface-to-surface contact; pressing said members together while said surfaces are in such contacting relation, to substantially exclude air from the interface formed by such contacting surfaces; and, while said surfaces are so contacting and pressed together, applying sufficient heat to said members adjacent said interface, but not directly to said contacting surfaces, to heat the metal of said contacting surfaces to a welding temperature substantially no higher than the solidus temperature of such metal, and substantially solely by the conduction of such applied heat through said members to said surfaces.

5. A method of welding together weldable metal members, as claimed in claim 4, in which the heat applied to said members is produced by high temperature flames directed against exposed surfaces of said members adjacent both sides of said interface.

6. A method of welding together weldable metal members, as claimed in claim 4, in which the heat applied to said members is produced by electric current induced within said members adjacent said interface.

7. A method of welding together weldable metal members, as claimed in claim 4, in which said members are pressed together initially and continuously at a pressure of at least 300 pounds per sqaure inch.

8. A method of welding together weldable metal members, as claimed in claim 4, in which the heat applied to said members is sufficient to heat the metal of said surfaces to a temperature between about 1000° C. and about 1300° C.

9. A method of welding together weldable metal members, as claimed in claim 4, in which the pressure initially applied is increased during the application of the welding heat.

10. A method of welding together weldable metal members, as claimed in claim 4, in which said surfaces and the portions of said members joining said surfaces are preheated before placing said surfaces in surface-to-surface contact.

11. A method of joining two ferrous metal members which comprises forming clean and smooth welding surfaces on portions of said members to be joined; forming clean, smooth welding surfaces on a ferrous metal insert and shaping said last-mentioned surfaces to provide surface-to-surface contacts with the respective welding surfaces of said members; positioning the welding surfaces of said members with said insert therebetween, and pressing together said members and insert while said welding surfaces are in abutting relation, thereby substantially excluding air from the interfaces of contact between the respective members and insert; and, while said members and insert are so contacting and pressed together, applying sufficient heat to said members, but not directly to said contacting surfaces, to heat the metal of said contacting surfaces by conduction to a welding temperature which is not above the solidus temperature of such metal.

12. A method of joining steel rails placed in track, which comprises forcing apart adjacent rails at a joint in said track; providing clean and smooth end surfaces on portions of said adjacent rails to be welded; providing clean welding surfaces on a steel insert and placing said insert in the space provided between said rails; effecting under pressure a surface-to-surface contact between the respective welding surfaces of said insert and the end surfaces of said rails so as to exclude air from the interfaces formed by said contacting surfaces; and, while said surfaces are so contacting and pressed together, heating said contacting surfaces to an elevated welding temperature below the solidus temperature of the steel by welding heat supplied to such surfaces substantially solely by conduction through the rail steel.

13. A method of welding together weldable metal members such as steel rails, beams, pipes, and the like, end to end, which method comprises providing a plane and clean metallic surface at an end of each of said members; placing said members in end to end relation with such surfaces abutting and in substantially complete contact; pressing such abutting surfaces together substantially uniformly throughout their area of contact and initially at a pressure of at least 300 pounds per square inch; and, while such surfaces are in such abutting relation and so pressed together, applying a heating medium against exposed portions of said members adjacent said abutting surfaces for a short time sufficient quickly and substantially uniformly to heat the steel of said surfaces solely by conduction to a welding temperature below the solidus temperature of the steel, thereby producing a welded joint having substantially the same chemical composition throughout, and having no abrupt change in metallographic structure.

14. A method of welding together steel rails, which comprises providing a plane, clean metallic surface at an end of each of the respective rails; forcing the rails together with said end surfaces in surface-to-surface contact under an initial pressure of at least 300 pounds per square inch; and heating said contacting end surfaces substantially uniformly while under pressure to a welding temperature within the range between about 1000° C. and about 1300° C. substantially solely by heat conducted to said contacting end surfaces through the rail steel.

15. Method as defined in claim 14, wherein, during the heating step, additional pressure is applied to force the contacting rail ends together as the steel at such ends is initially softened by heat.

16. Method as defined in claim 14, wherein the welding heat is supplied by at least one oxy-fuel gas flame directed upon the exposed lateral surfaces of the said rails adjacent the abutting rail ends over a zone extending not substantially more than five inches on either side of the contacting surfaces.

17. A method of welding metal members, which comprises placing surfaces of said members in abutting relation under pressure, with the abutting surfaces in intimate surface-to-surface contact to substantially exclude air from the interface formed by such contacting surfaces; and, while said members are so pressed together in abutting relation, heating said contacting surfaces to an elevated welding temperature no higher than the solidus temperature of the metal, to complete the weld substantially solely by heat conducted to said contacting surfaces through said metal members.

18. A method of welding together opposed ends of weldable metal members such as steel rails, beams, pipes, and the like, which method comprises placing such members end to end and in abutting relation with the abutting end surfaces in surface-to-surface contact; pressing said members together while said end surfaces are in such contacting relation, to substantially exclude air from the interface formed by such contacting surfaces; and, while such end surfaces are so contacting and pressed together, applying sufficient heat to said members adjacent said interface, but not directly to said contacting surfaces, to heat the metal of said contacting surfaces to a welding temperature not higher than the solidus temperature of the metal, substantially solely by the conduction of such applied heat through said members to said surfaces.

19. A method of welding together weldable metal members, which comprises placing surfaces of said members in abutting relation and surface-to-surface contact; pressing said members together while said surfaces are in such abutting and contacting relation, to substantially exclude air from the interface formed by such contacting surfaces; and, while said surfaces are so contacting and pressed together in abutting relation, heating the metal of said contacting surfaces to a welding temperature substantially no higher than the solidus temperature of such metal.

20. A method of welding together weldable metal members which comprises placing surfaces of said members in abutting relation and surface-to-surface contact; pressing said members together while said surfaces are in such abutting and contacting relation, to substantially exclude air from the interface formed by such contacting surfaces; and, while said surfaces are so contacting and pressed together in abutting relation, heating the metal of said contacting surfaces to a welding temperature substantially no higher than the solidus temperature of such metal by heat produced by high temperature flames directed against surfaces of said members exposed to said flames adjacent both sides of said interface.

21. A method of welding together weldable metal members, which comprises placing surfaces of said members in abutting relation and surface-to-surface contact; pressing said members together while said surfaces are in such abutting and contacting relation, to substantially exclude air from the interface formed by such contacting surfaces; and, while said surfaces are so contacting and pressed together in abutting relation, heating the metal of said contacting surfaces to a welding temperature substantially no higher than the solidus temperature of such metal by heat produced by a high frequency electric current induced within said members adjacent said interface.

OSKAR RENNER, JR.